United States Patent [19]
Barrow

[11] Patent Number: 5,669,691
[45] Date of Patent: Sep. 23, 1997

[54] AIRPORT RUNWAY OR TAXIWAY LIGHT FIXTURE

[75] Inventor: Fred Robert Barrow, Oakville, Canada

[73] Assignee: Tristar Electric Inc., Ontario, Canada

[21] Appl. No.: 391,219

[22] Filed: Feb. 21, 1995

[30] Foreign Application Priority Data

Jan. 27, 1995 [CA] Canada ................................ 2141250

[51] Int. Cl.⁶ ...................................................... F21V 13/04
[52] U.S. Cl. .................. 362/153.1; 362/329; 362/365; 362/390
[58] Field of Search ........................ 362/153.1, 364, 362/365, 390, 244, 246, 329, 339

[56] References Cited

U.S. PATENT DOCUMENTS

| | | |
|---|---|---|
| 3,007,034 | 10/1961 | Reed et al. ................... 362/153.1 |
| 3,113,726 | 12/1963 | Pennow et al. . |
| 3,250,906 | 5/1966 | Loch . |
| 3,369,113 | 2/1968 | Loch . |
| 3,535,504 | 10/1970 | Beal et al. . |
| 4,382,274 | 5/1983 | De Backer et al. . |
| 4,924,364 | 5/1990 | Pannier . |
| 5,438,495 | 8/1995 | Ahlen et al. ................... 362/153.1 |

FOREIGN PATENT DOCUMENTS 2172096  9/1986  United Kingdom .

OTHER PUBLICATIONS

Cooper Industries Inc., Crouse–Hinds Airport Lighting Products, Document No. 9312: "Instruction Manual FAA/ICAO Flush Taxiway Inset Light, Part Number Series: 85205", Dec. 1993.

Hughey & Phillips, Inc., "Instruction Manual for STA–K–LEEN Fully Flush Taxiway Lights", May 1993.

U.S. Department of Transportation, Federal Aviation Administration, AC No. 150/5345–46A, "Specification for Runway and Taxiway Light Fixtures", Jun. 1984.

Transport Canada, Air Navigation System Requirements Branch, Publication No. TP 312E, "Aerodome Standards and Recommended Practices", 4th Ed., Mar. 1993.

*Primary Examiner*—Ira S. Lazarus
*Assistant Examiner*—Alfred Basichas
*Attorney, Agent, or Firm*—Gifford, Krass, Groh, Sprinkle, Patmore, Anderson & Citkowski, P.C.

[57] ABSTRACT

An inpavement light fixture for mounting in an airport runway or a taxiway having a cover with a flat surface and one or two windows for the passage of a light beam. An optical prism is detachably mounted in a cavity formed in the cover beside and beneath each window. The prism has three flat sides forming an equilateral triangle with two of the sides sloping upwardly to a top edge positioned at a top of its window. A special sealing member fits over the prism and preferably covers one of the two sides which slope upwardly. This member extends about a lower portion of the prism and forms a water tight seal. An electric light is mounted in a bottom receptacle on which the cover is supported. A light channel is formed in the top of the cover and extends from each window towards an edge of the cover. This channel has a bottom which slopes at a small angle to the flat top.

15 Claims, 6 Drawing Sheets

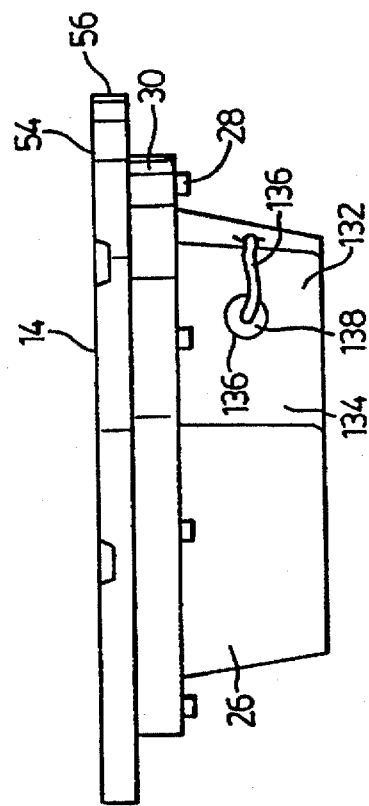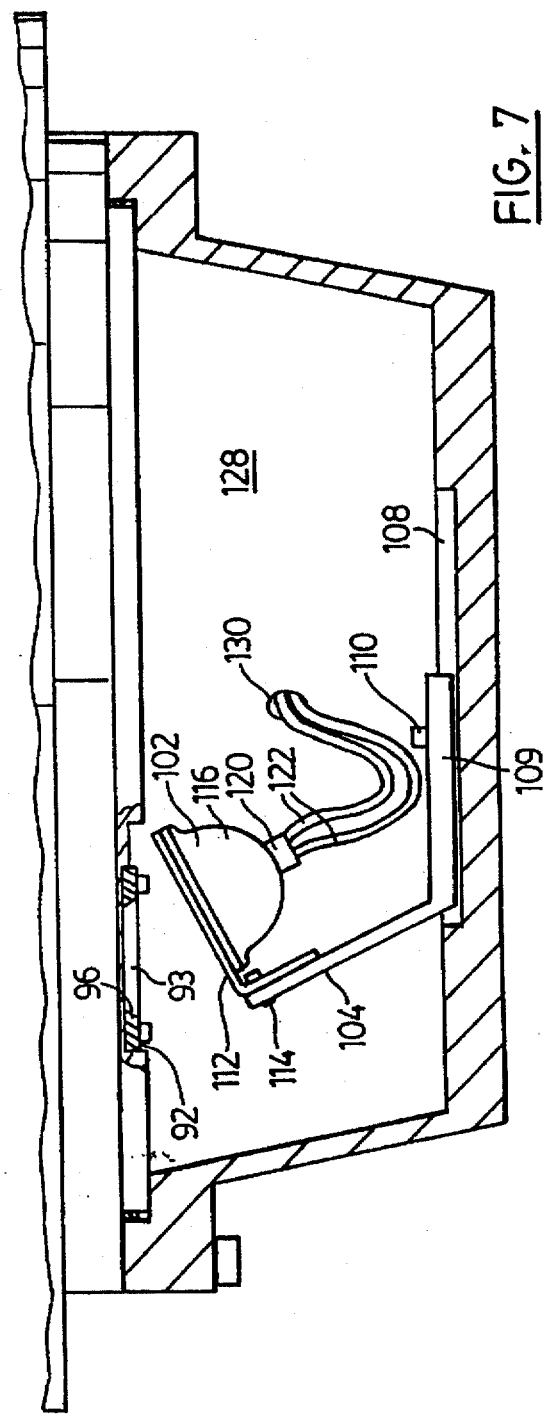

AIRPORT RUNWAY OR TAXIWAY LIGHT FIXTURE

BACKGROUND OF THE INVENTION

This invention relates to inpavement light fixtures for mounting in the pavement of an airport runway or taxiway.

Inpavement light fixtures for use in runways and taxiways at airports are well known and have been in use for a number of years. These light fixtures are designed to be almost level and in some cases level with the surface of the runway or taxiway, permitting aircraft to roll over the fixture and permitting the light fixture to be mounted in the area of the runway or taxiway itself rather than at the edge thereof. These light fixtures are often directional in nature, that is they beam light in a certain direction in order to give proper guidance to an aircraft pilot and they often have the capability of displaying coloured light beams such as red or green in order to provide a certain signal to a pilot.

One of the difficulties with many of the prior art designs for such light fixtures is that the top of the light fixture is not in fact flush with the surrounding pavement. They in fact project a short distance above the pavement, for example ⅜ths to ½ inch. Perhaps the greatest difficulty with such light fixtures is that they can be readily damaged by runway snow ploughs used to clear snow from the runway or taxiway in winter weather. As these light fixtures are relatively expensive, this can be a serious problem indeed for airport operators and managers.

An example of a known runway light fixture that projects a short distance above the pavement is that shown in U.S. Pat. No. 3,250,906 issued May 10, 1966 to *Westinghouse Electric Corporation*. This light fixture has a top casting assembly which is mounted in a bottom receptacle which in turn is set in a shallow hole in the runway or taxiway. The top assembly rises a short distance from its edge to a central portion having a window were a prismatic lens is mounted. This fixture in fact projects about ⅜ths inch above the surrounding pavement. Another difficulty with this known fixture is that the lens is sealed in its opening by means of a sealing material which acts like an adhesive, making it difficult to remove and replace the lens should it become broken or damaged.

Another difficulty with known inpavement lighting fixtures, particularly in climate having cold winters, is that the top cover of the light fixture, which often has one or two grooves or recesses formed therein is made of an ordinary metal such as aluminum alloy or steel. Snow and particularly ice will adhere to the top cover of the fixture and cannot be removed easily by a snow plough or power broom. Full removal of the snow or ice from the top of the light fixture can be important to the proper operation of the fixture and its usefulness to pilots.

U.S. Pat. No. 4,382,274 issued May 3, 1983 to *Societe Anonyme des Etablissements Adrien De Backer* teaches an inpavement light fixture wherein the top cover is in fact flush with the surrounding runway or taxiway. This light fixture is mounted on a cylindrical light base which can, for example, be a 12 inch diameter steel base. On top of this base is mounted a top assembly which includes a cover having an optical system suspended to the underside thereof. The cover assembly is itself circular and fits over the light base. However, in addition to the cover, this light fixture also requires two outwardly extending light channel plates for guiding the output light beams. Accordingly, it is not easy or straightforward to use this type of light fixture in a standard inpavement installation having simply a 12 inch diameter base for holding the fixture. It is necessary with such fixtures to drill out or cut away channels in the pavement to accommodate the channel plates, thus increasing the complexity of the installation and the expense thereof.

It must also be kept in mind that inpavement light fixtures for airports must meet certain government imposed standards with respect to the intensity and direction of the light beam produced by the fixture. For example, in the United States, the U.S. Department of Transportation, Federal Aviation Administration, has published certain standards and specifications for runway light fixtures. The light fixtures must generally be able to withstand a range of temperature conditions, they must not project more than a certain distance above the finished grade, often one inch or less, and they must meet certain photometric requirements including beam coverage angles and light intensity.

It is an object of the present invention to provide an inpavement light fixture that employs an optical prism and an electric light capable of providing a strong, bright light beam that meets government imposed standards for a runway or taxiway at an airport.

It is a further object of the present invention to provide an inpavement light fixture which is relatively easy to install and which has a flat top surface, the dimensions of which correspond substantially to horizontal dimensions of a top portion of a base of the fixture.

The inpavement light fixture described herein can be constructed so that it is completely flush with the surrounding pavement of the runway or taxiway while at the same time the fixture can be designed to provide a strong light beam that meets and exceeds government imposed requirements for such light fixtures.

SUMMARY OF THE INVENTION

According to one aspect of the invention, an inpavement light fixture for mounting in pavement of an airport runway or taxiway includes a cover with a generally flat top surface and a bottom, this cover having at least one window for passage of an output light beam and a cavity formed therein. The cavity is open at the bottom of the cover. An optical prism is detachably mounted to the cover adjacent the window. This prism has three flat sides forming an equilateral triangle with two of said three sides sloping upwardly to a top edge which is positioned at a top of the window. The prism fits in the aforementioned cavity. A sealing member fits over the prism and covers one of the two sides which slope upwardly. This sealing member also extends about a lower portion of the prism and forms a water tight seal between the cover and the prism. The fixture also has an electric light capable of beaming light into the prism. This light is mounted in the fixture and below the cover. There is also a detachable member for holding the prism in the cavity, this member being attached to the cover. The fixture includes a bottom receptacle on which the cover is supported. Preferably the optical prism is formed with a bottom flange that projects horizontally from the bottom of the two sides of the prism that slope upwardly. The sealing member extends over an upper surface of this flange.

According to another aspect of the invention, an inpavement light fixture for mounting flush with pavement of an airport runway or taxiway includes a cover assembly with a flat top surface that extends to a peripheral edge of the cover assembly. At least one window is formed in the cover for passage of an output light beam. The cover has a light channel formed in its top and extending from the at least one window towards an edge of the cover. The light channel has a bottom that slopes at a small angle to the flat top surface and up to the plane of the flat top surface. The channel is confined to the cover assembly. There is also an optical prism for projecting the output light beam which is mounted in the cover assembly adjacent the window. An electric light device for beaming light into the prism is mounted in the fixture below the top surface of the cover assembly. The entire cover assembly is detachably mounted on a fixture base and extends generally horizontally in use when the fixture is mounted in pavement. The horizontal dimensions of the cover assembly correspond substantially to horizontal dimensions of a top portion of the base so that the cover assembly in use does not project a substantial horizontal distance beyond the top of the base.

In a preferred embodiment, the top surface of the cover is very flat and does not at any point thereon project more than ⅛th inch above the height of the top surface at the peripheral edge of the cover.

According to a further aspect of the invention, a cover for an inpavement light fixture capable of being mounted in the pavement of an airport runway or taxiway comprises a cover member with a generally flat upper surface and at least one opening for the passage of a light beam through the cover. A transparent optical device is mounted in the opening to project the light beam in a desired direction. The flat upper surface is covered with a layer of polytetrafluoroethylene (such as the material sold under the trade-mark TEFLON) to prevent sticking of snow or ice to the cover.

According to still another aspect of the invention, a light fixture for mounting in the pavement of an airport runway comprises a cover having a generally flat top surface and an opening for the passage of an output light beam. The fixture includes an optical prism device mounted in the cover adjacent to the opening. The prism device incorporates therein a dichroic filter so that the output light beam has a desired colour. The prism device has three flat exterior sides with each extending at a 60 degree angle to the other two sides. One of the three sides slopes upwardly and extends across the opening. The cover is supported by a bottom receptacle and an electric light is mounted in the fixture and is arranged to beam light into the prism device from below the cover.

It should be noted that the dichroic filter feature is optional. In some applications, the runway lights can be clear lights (not coloured).

Further features and advantages will become apparent from the following detailed description taken in conjunction with the drawings.

BRIEF DESCRIPTION OF THE DRAWINGS

FIG. 5 is a side elevation of an inset light constructed in accordance with the invention, this view showing both the cover and a bottom receptacle;

FIG. 7 is an elevational view taken in cross-section showing the manner in which an electric light can be mounted in the bottom receptacle;

DETAILED DESCRIPTION OF PREFERRED EMBODIMENTS

Figure 3:
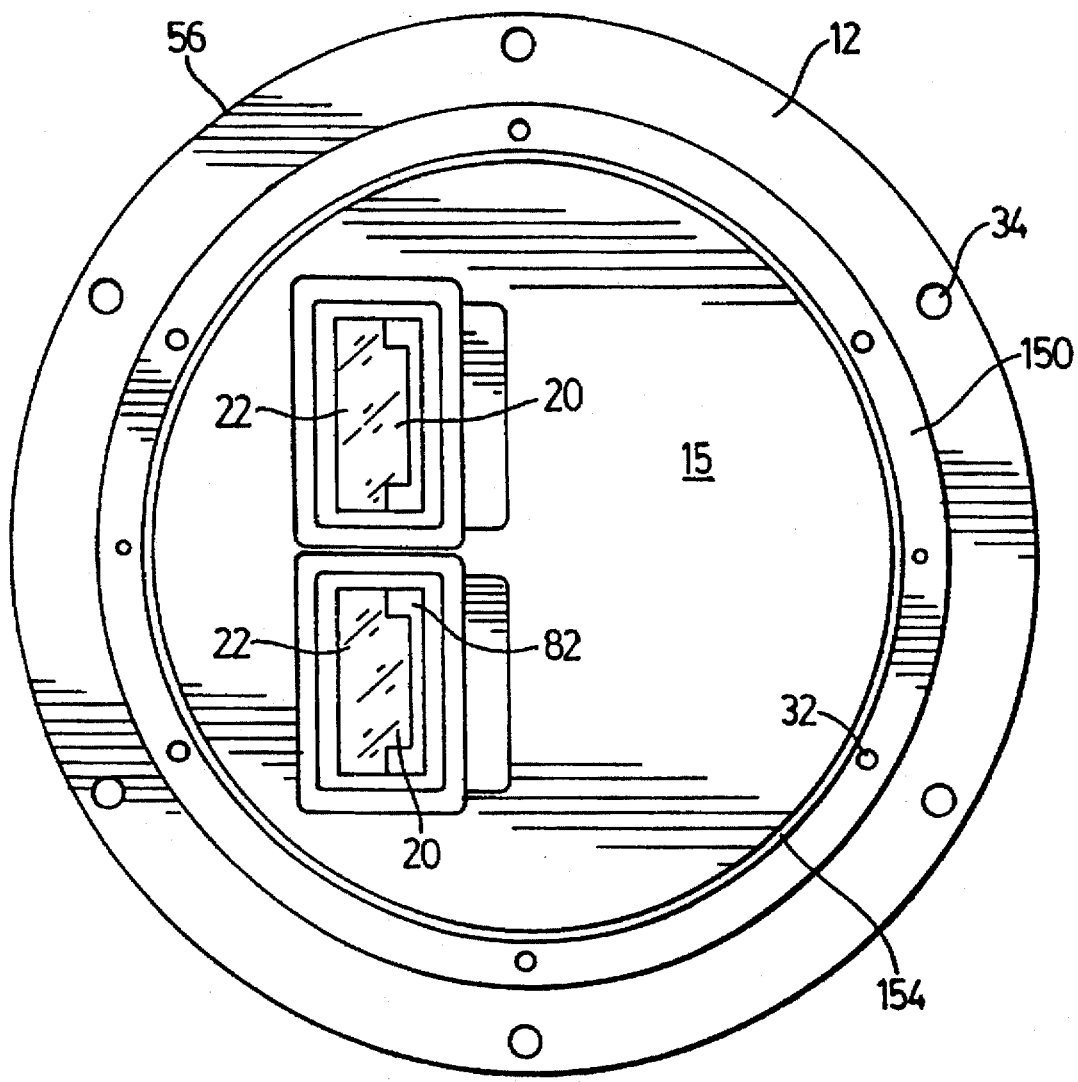
FIG. 3 is a bottom view of the cover of the inset light of FIG. 1.
Figure 9:
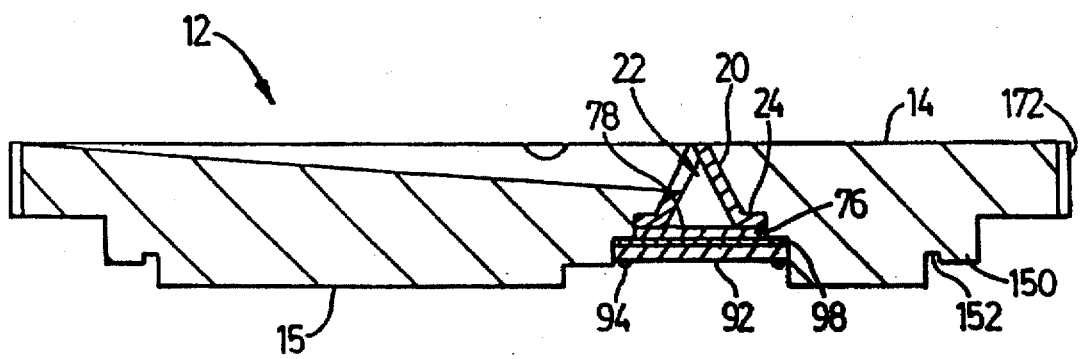
FIG. 9 is a cross-sectional elevation taken along the line IX—IX of FIG. 8 showing further details of the cover and the cavity formed therein to accommodate the optical prism.

An inpavement light fixture 10 for mounting in the pavement of an airport runway or taxiway includes a cover member 12 with a generally flat top surface 14 and a bottom surface 15 (see FIGS. 3 and 9). The cover 12 has at least one window for passage of an output light beam. However, in the illustrated preferred embodiment of FIGS. 1 and 3 there are two such windows 16 and 18. As shown in FIG. 9, there is a cavity 20 formed in the cover adjacent each window, this cavity being open at the bottom of the cover. An optical prism 22, described in more detail hereinafter is detachably mounted in the cover 12 adjacent each window. A sealing member 24 fits over this prism, this sealing member being made of rubber or a rubberlike material in order to create a good seal between the prism and the cover so that water cannot pass through the window and into the interior of the light fixture.

Figure 1:
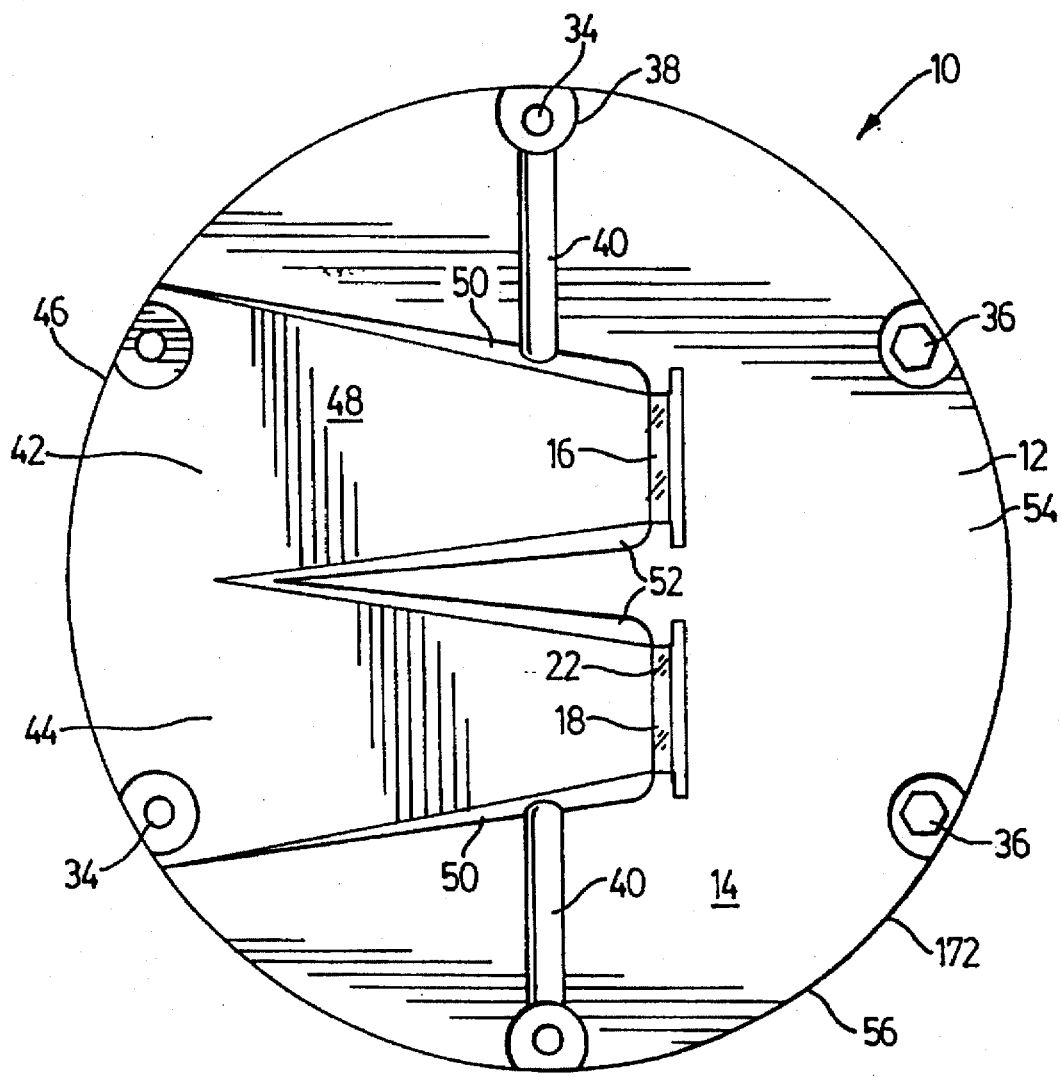
FIG. 1 is a top view of a unidirectional inset light constructed in accordance with the invention.
Figure 2:
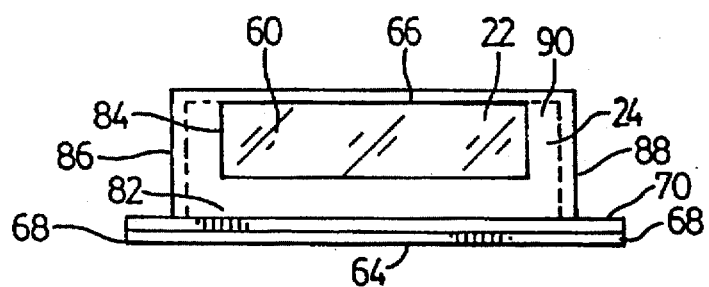
FIG. 2 is a front elevation of an optical prism used in the inset light of FIG. 1, said prism being fitted with a rubber sealing member.

As shown in FIG. 5, the entire cover is detachably mounted to the top of a fixture base or bottom receptacle 26 by means of a number of bolts or screws 28. These bolts or screws are inserted upwardly through a top circumferential flange 30 of the base and the screws thread into threaded ¼ inch holes 32 formed in the cover 12. Also distributed evenly about the circumference of the cover are a number of larger bolt receiving openings 34 which receive bolts 36, only a couple of which are shown in FIG. 1. It will be understood that the preferred inset light of the invention can be detachably mounted in a standard exterior receptacle or can permanently mounted in the runway or taxiway or apron below the top of the pavement. These lights can be used at or form a stop bar on taxiways and aprons. One standard form of receptacle is a 12 inch diameter circular can that can be made of a strong metal such as steel or aluminum alloy and which should be waterproof. As this exterior receptacle forms no part of the present invention, it has not been illustrated in the drawings. Preferably, the holes 34 are surrounded by a generally circular recess or counterbore 38 which accommodates the head of the bolts 36. In this way the cover 12, including the attachment bolts 36, is made as flush as possible with the surrounding pavement. Preferably a small channel or groove 40 extends radially inwardly from two of the recesses 38 located on opposite sides of the cover. The grooves 40 are provided for draining light channels 42 and 44 located in the top of the cover and to drain surface water away from each lens face.

Located in front of each window 16 and 18 is the light channel 42, 44 which extends from its respective window towards the circular edge 46 of the cover. Each channel has a substantially flat bottom 48 that slopes at a small angle to the flat top surface 14 and up to the plane of the top surface. Each channel is confined to the circular cover 12. Each channel should be as shallow as possible. In one preferred embodiment, for example, the length of the ramp is approximately 6 inches while the depth of this ramp at the window is ½ inch. As shown, the ramp preferably widens or fans out in a direction moving away from the window and at opposite sides of the ramp are short, steeply sloped side walls 50 and 52. The purpose of each channel is of course to permit the light beam coming from the optical prism to leave the light fixture at the appropriate angle so that it can be seen by aircraft pilots, when required. Because of the unique optics of the preferred light fixture, it is not necessary for the light channels 42 and 44 to extend beyond the cover itself which can be of standard size and this is true whether the fixture, is a unidirectional inset light such as that shown in FIG. 1 or a bi-directional inset light such as that shown in FIG. 8. Thus, it is not necessary for the ramps to extend into the area of special light channel plates. These light channel plates which are used in some prior art runway lights require extra additional work to be installed, particularly if the light fixture is to be installed in an existing runway or taxiway. In order to accommodate these horizontal extensions, the surface of the pavement must be cutaway to precise dimensions and depth to accommodate the channel plates. With the applicant's invention, it is possible to install the inpavement light fixture in existing standard size cans or light receptacles which generally have a circular top.

In a particularly preferred embodiment of the light fixture 10, the cover is coated with a layer 54 of polytetrafluoroethylene, commonly known by its trade name or trade mark TEFLON. The layer 54 helps to prevent the sticking of snow or ice to the cover. The layer 54 extends not only over the flat top surface 14 of the cover but also over the light channels 42 and 44, over the surface of recesses 38, and over the circular sidewall 56 of the cover. The material polytetrafluoroethylene or TEFLON is known to have a low co-efficient of friction so that material such as ice will not stick to it and at the same time this material is relatively resistant to scraping and thus it is not easily damaged by the blade of a snow plough.

Figure 4:
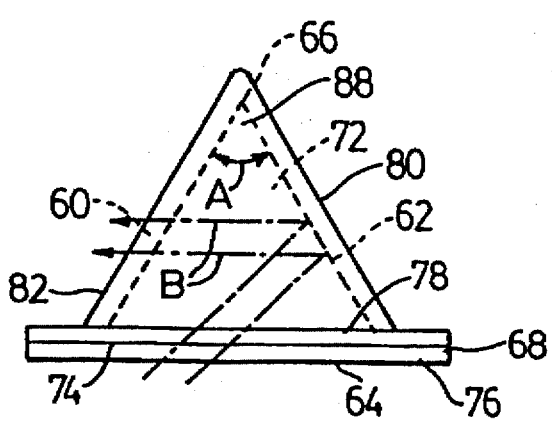
FIG. 4 is an end view of the optical prism and sealing member of FIG. 2.

Turning now to the construction of the preferred optical prism used in the fixture 10, this prism 22 has three flat sides which together substantially form an equilateral triangle. The three flat sides are indicated at 60, 62 and 64 in FIG. 4. The sides 60 and 62 slope upwardly to a top edge 66 which is positioned at the top of the aforementioned windows 16 or 18. The prism is made preferably with high quality optical glass and may be formed either from a single glass piece or two separate pieces as explained hereinafter. Preferably the prism member is formed with a bottom flange 68 that projects horizontally from the bottom of the two upwardly sloping sides 60 and 62. The aforementioned rubber sealing member 24 also is formed with a circumferentially extending bottom flange 70 that extends over an upper surface of the glass bottom flange 68. It will be appreciated that because the optical prism forms an equilateral triangle when viewed from the side, the three flat sides 60, 62 and 64 each extend at a 60 degree angle to the other two sides. One of these angles is indicated by angle A in FIG. 4. Note that although the two end walls of the prism can be perpendicular to these three sides, they need not be perpendicular but could be chamfered, ie. at an angle of about 85° to the side 64.

If the prism member 22 is made from two separate transparent members, the first member is in the form of an elongate prism which itself forms an equilateral triangle in transverse cross-section. This first member is indicated at 72 in FIG. 4. The bottom of this first member is located at 74. The second transparent member 76 comprises a flat glass plate affixed to and covering the bottom surface 74. The two members are firmly attached to one another by a clear adhesive suitable for optical use.

If the optical prism is to give off a coloured light beam, the prism 22 preferably has incorporated therein a dichroic filter which is coloured to give the required light beam. If the optical prism 22 is made from two separate transparent members, dichroic colouring can be applied to the top side 78 of horizontally extending glass member 76 before the two members are adhered together. It is also possible to apply the dichroic colouring to the bottom of the member 76. It will thus be seen that the present optical prism has an integral filtering device, that is the filter is an integral part of the prism itself, thus avoiding the need for any separate colour filter. One advantage of this dichroic filter is that it does not absorb as much light as would an absorption filter.

As indicated, it is also possible to form the optical prism 22 as an integral one piece prism having top and bottom portions. The top portion would be of the same configuration as the aforementioned first member 72 while the bottom portion would be of the same configuration as the aforementioned flat glass member 76. Thus, the bottom portion would be generally planar with opposite edge sections projecting horizontally beyond bottom edges of the top portion. In this version of the prism, any dichroic colouring is applied to the bottom surface thereof.

An important feature of the present optical prism is that the sloping back surface or side 62 is coated with a reflective material such as silver. Thus, incoming light striking this rear surface is reflected towards the front side 60 through which the light passes as indicated by the light beams B in FIG. 4. This highly efficient reflection set up by the prism is one reason why the preferred light fixture of the invention has excellent light beam characteristics. Use of the reflective coating can sometimes be avoided if the side 62 of the prism where reflection must occur does not contact anything else, in which case a mirror effect will occur naturally.

As illustrated, the preferred sealing member 24 fits over the prism and in fact covers the reflective side 62 with its flat side 80 which slopes upwardly. The sealing member also has a second upwardly sloping side 82 but this side has a relatively large rectangular opening 84 formed therein for the passage of light out of the prism. Connecting together the two sloping sides are two rubber end walls indicated at 86 and 88 which are of triangular configuration. Extending about the bottom of all four walls is the aforementioned bottom flange 70 which, in one embodiment, is ¼ inch wide.

In the preferred embodiment of the sealing member, the front surface of the prism is protected to some extent by upward extensions 90 of the second sidewall 82. Thus, at no point is the glass prism making possible damaging contact with the metal cover 12 and the exposed front side 60 of the prism is surrounded with a rubber or rubber-like sealing layer so that an excellent waterproof seal is provided.

The light fixture also comes with detachable means for holding the prism 22 in the cavity 20. In the illustrated preferred embodiment, this holding mechanism comprises a generally flat metal plate 92 (see FIG. 9) having an opening 93 formed centrally therein for the passage of light to the prism. Threaded fasteners in the form of bolts or screws 94 secure the plate 92 to the cover. The rectangular opening in the plate 92 has upwardly and inwardly sloping side walls 96 as indicated in FIG. 7. This allows as much light as possible into the prism. Instead of rectangular, the opening 93 in plate 92 can also be circular. A circular opening 93 may be easier to form and can be made to allow as much useful light into the prism as a rectangular opening. A flexible gasket 98 is arranged between the plate 92 and the bottom surface of the prism. This rectangular gasket has a central opening of the same size as the top of the opening in the plate 92 for the passage of light into the prism. This gasket extends about the perimeter of the bottom surface of the prism.

Figure 6:
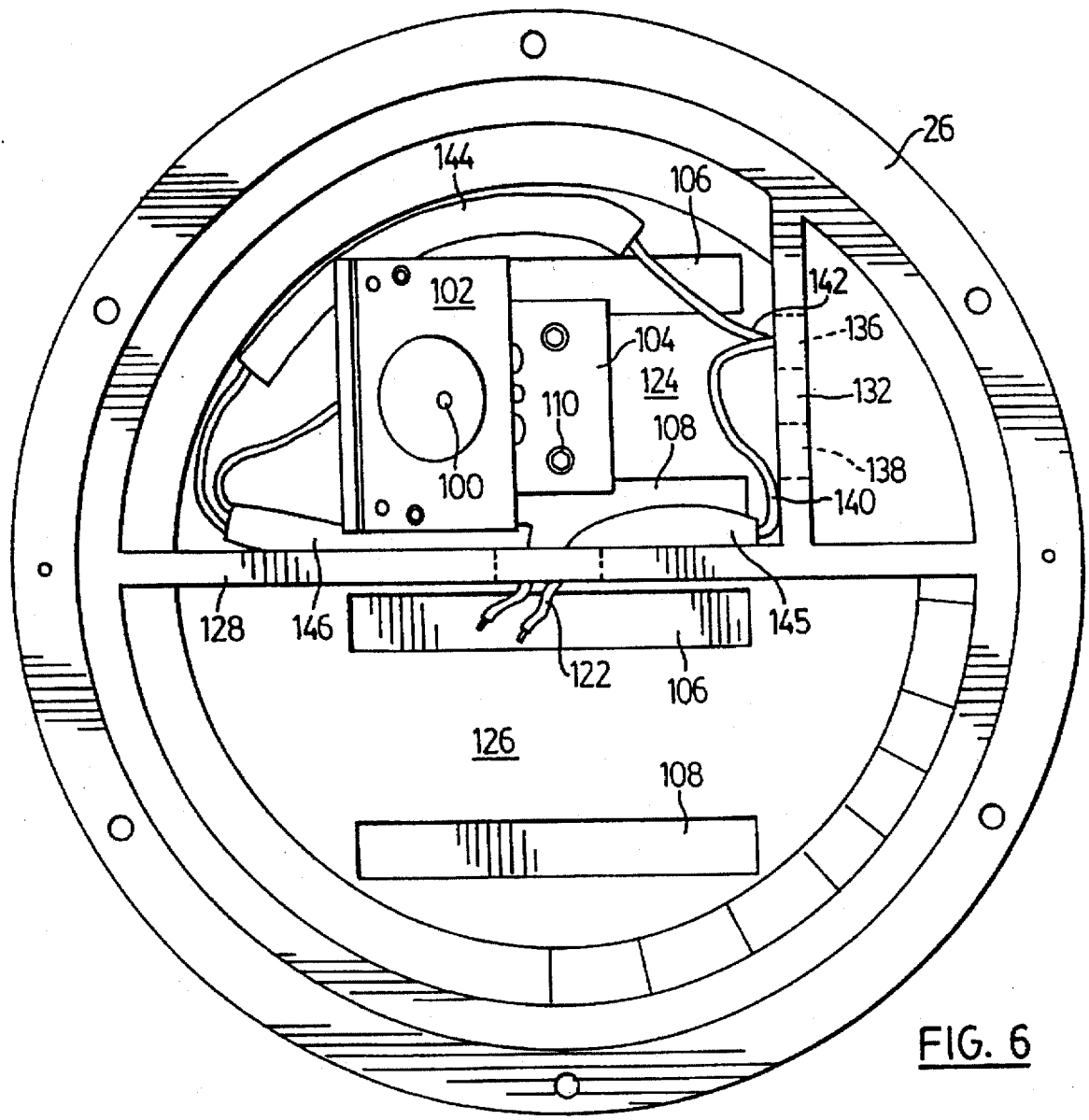
FIG. 6 is a top view of the inset light with the cover removed, this view showing one electrical light mounted in place in the bottom receptacle.

Turning now to FIGS. 6 and 7 which illustrate the preferred electrical lighting system for the light fixture 10, an electric light bulb 100 is adjustably mounted in fixture base 26. Only one lamp assembly 102 has been illustrated in FIG. 6 for ease of illustration. The lamp assembly 102 is mounted on an adjustable bracket 104 which forms an obtuse angle when viewed from the side as shown in FIG. 7. This bracket, which has a channel-shaped bottom section, is slidable along two, horizontally extending channels 106 and 108. The position of the bracket can be adjusted by moving the bracket to the required position and then tightening two screws 110. These will tighten into pre-drilled tapped holes located at the most efficient position for the lamp. The short downward extensions 109 of the bracket rest snuggly against the sides of the channels 106 and 108 and thus act to keep the light properly aligned. The lamp assembly is mounted on right angle bracket 112 which is attached by bolts 114 to the top end of the bracket 104. The lamp assembly includes a concave reflector member 116, in the centre of which the light bulb 100 is mounted. The bulb is mounted in socket 120 which is connected to a suitable source of electric power by means of wires 122.

With the particular reference to FIG. 6, it will be seen that in the preferred embodiment the fixture base is divided into two main chambers 124 and 126 by a central dividing wall 128. This central wall extends to the top of the fixture base and helps to support the cover 12 from beneath. The wall 128 also stops the light in one chamber from passing into the other chamber. An aperture 130 can be formed in the wall 128 for the passage of the electrical wires 122 into the chamber 126.

The chamber 124 is somewhat smaller than the chamber 126 because of an end wall 132 that extends perpendicular to the wall 128. The reason for the end wall 132 can be seen from FIG. 5. In particular, the fixture base 26 is not completely cylindrical but has a major recess 134 formed therein. The recess 134 is to accommodate the connection of the light fixture 10 to the main power cord 136. The molded one piece cord can extend through a sealed ⅜ths inch tapped opening 136 and the cord is mounted in the wall 132 by beans of a suitable threaded cord connector 138 of standard construction. If desired, or if necessary, a second opening 138 can also be formed in the wall 132 as indicated in FIG. 6 for the passage of further electrical lines. The main power line 136 separates into two electrical wires 140 and 142 and where required, the electrical wires can be protected by protective, insulating sheaths shown at 144 to 146 in FIG. 6.

A standard light bulb 100 that can be used in the light fixture of the invention is a 45 watt 6.6 amp bulb available from General Electric but a smaller or larger output light bulb can be used, if available, while at the same time providing the required beam strength and beam characteristics. For example, a 30 watt light bulb which is available could be used and even a 20 watt bulb could be used if it is available from manufacturers. The preferred light assembly 102 is known as a spot light, which light is able to beam or concentrate the light from the bulb in the desired direction, that is through the rectangular or circular opening in the plate 92 and into the prism. One suitable form of electric lamp is an MR16 miniature quartz reflector lamp.

The unidirectional light of FIGS. 1 and 3 can be wired with two separate electrical circuits if desired. Two circuits can be used, for example, to permit the light fixture to display two different light colours using two lamps, one for each colour. A second lamp can also be used so there will be a back-up if one lamp should fail.

The cover 12 and fixture base 26 can be made entirely of cast aluminum alloy or aluminum. As shown in FIG. 9, the preferred form of cover 12 is formed with a circumferential shoulder 150 in which the threaded holes 32 are formed. Located at the radially inner edge of this shoulder is a circumferential groove 152 in which there is preferably located a round O-ring seal 154 (see FIG. 3). Because of the presence of this seal, water cannot leak into the fixture through the joint between the cover and the fixture base. The preferred screws to connect the two sections together are ¼×1½ inch stainless steel socket head cap screws.

Figure 8:
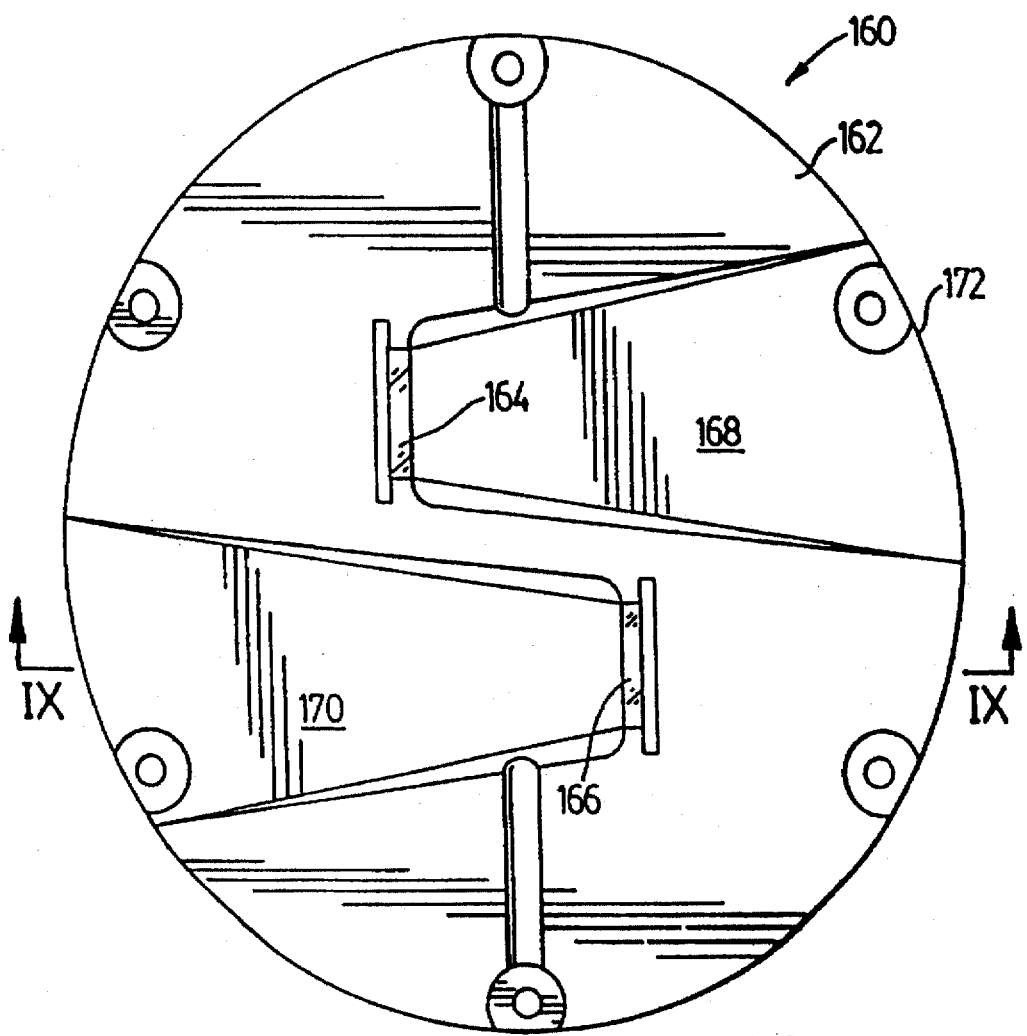
FIG. 8 is top view of a bi-directional inset light constructed in accordance with the invention.

The present invention can also be used to make bi-directional inset lights such as the light fixture 160 shown in FIG. 8. The cover 162 is also made with a completely flat top so that the light fixture can be entirely flush with the surrounding pavement. This light fixture also has two windows 164 and 166 but they are located in opposite quadrants from one another and their respective light channels 168 and 170 extend in opposite directions from the windows. It will be understood that the construction of the optical prism located at each of the windows 164 and 166 is the same as that for the uni-directional inset light as is the construction of the light assemblies although, in the case of the bi-directional inset light, the light assemblies are oriented in opposite directions.

It will be appreciated that although some prior art inset light fixtures claim to be flush taxiway or runway lights, they in fact project a short distance above the surrounding runway or taxiway surface unlike the light fixture of the present invention. Even a projection of ¼ inch above the surrounding pavement by the light fixture can be enough for the top of the fixture to be caught by a snow plough or other heavy equipment, resulting in considerable damage to the light fixture. For example, a well known light fixture sold by Hughey & Phillips, Inc. of Simi Valley, Calif., which fixture purports to be a flush taxiway light, in fact projects approximately ½ inch above the surrounding pavement or grade. Another taxiway inset light sold by the Crouse-Hinds Division of Cooper Industries although claiming to be flush in their literature in fact projects 0.26 inch above the surrounding grade. The present light fixture is able to be made with a very flat top surface 14 so that it does not in fact project at any point above the surrounding pavement or the height of the top surface 14 at the peripheral edge of the cover 12. At a minimum, the cover should not project at any point thereon more than ⅛th inch above the height of the top surface 14 at the peripheral edge of the cover 12, this peripheral edge being indicated at 172 in the drawings.

Figure 10:
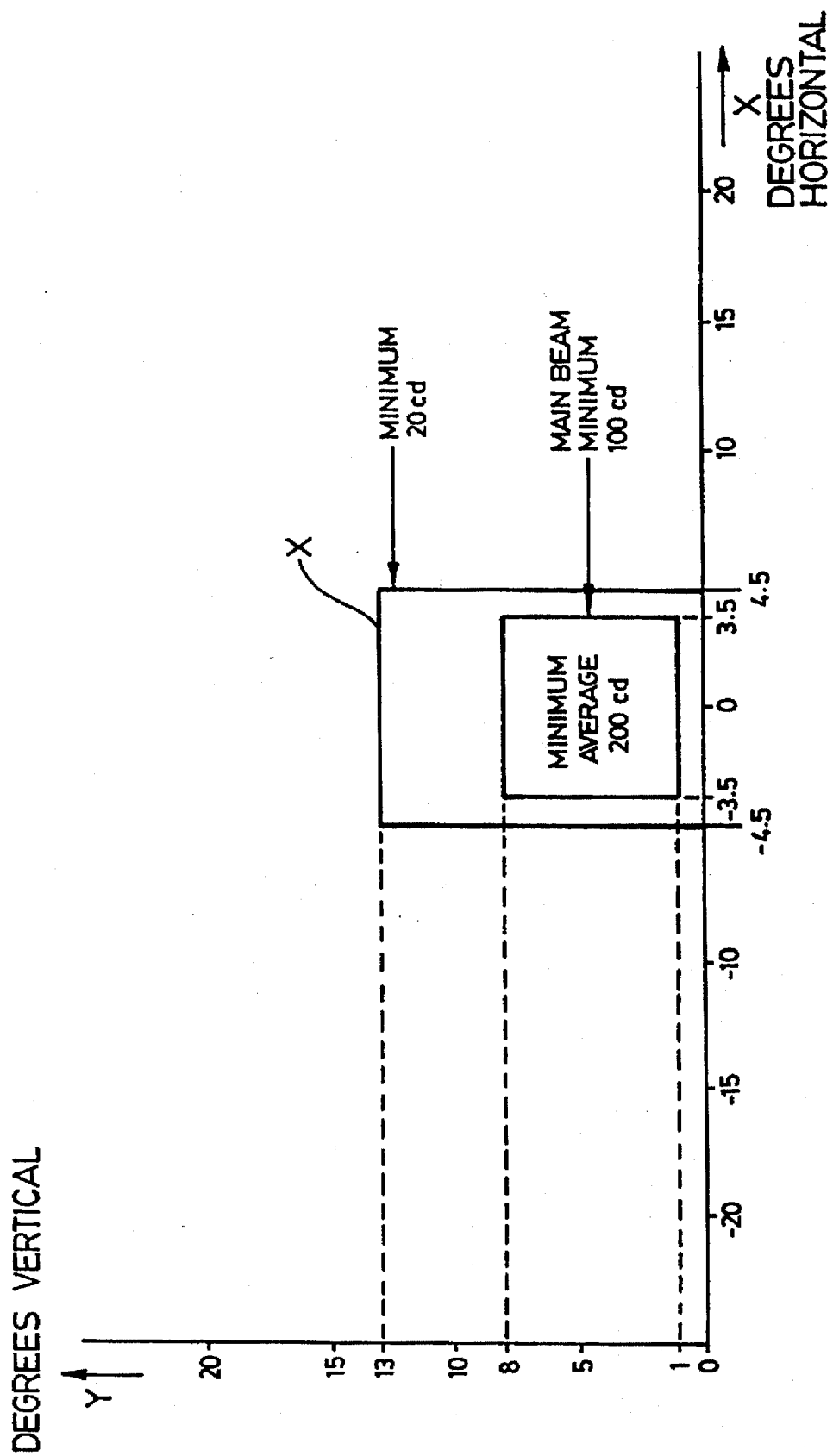
FIG. 10 is a graph comprising an isocandela diagram illustrating the light power requirements for certain taxiway centreline lights.

The inset light fixture of the invention has been subjected to independent photometric tests conducted by the Canadian Standards Association and the light beam and light output produced by this light fixture has been found to meet and exceed standards for taxiway lights established by Transport Canada and similar requirements for such lights published by the U.S. Federal Aviation Administration. The Canadian requirements stipulate that the average intensity of the main beam of a taxiway centreline light spaced at longitudinal intervals of 15 meters or a stop bar light intended for use in straight sections in runway visual range conditions less than a value in the order of 1400 feet (400 m) shall be as illustrated in FIG. 10 of the drawings. FIG. 10 is an isocandela diagram for such lights and indicates that in a square region measuring 7 degrees horizontally and 7 degrees vertically starting at 1 degree above horizontal, the beam must have a minimum average power of 200 cd with a main beam minimum of 100 cd. In a larger rectangle measuring a total of 9 degrees horizontally and 13 degrees vertically, the beam output must be a minimum of 20 cd.

In a test conducted by the Canadian Standards Association, the inset light of the present invention produce the results set out in Table 1 below:

TABLE 1

| Beam Spread | Minimum Average Intensity (Candela) | Minimum Peak Intensity (Candela) |
| --- | --- | --- |
| Vertical: 1° to 8°<br>Horizontal: −3.5° to 3.5° | 877.79 cd | 138.66 cd |

It is clear from Table 1 that the inset light of the present invention far exceeded the requirements of Transport Canada for minimum average intensity and also exceeded the requirements for minimum peak intensity for beam extending from 1 degree vertical to 8 degrees and horizontally from −3.5 degrees to 3.5 degrees. It is also believed that provided the inset light is properly installed, the light beam will also exceed the minimum light intensity requirements for the layer rectangular area indicated at "X" in FIG. 10.

TABLE 2

| | HORIZONTAL DEGREES | | | | | | | | |
| --- | --- | --- | --- | --- | --- | --- | --- | --- | --- |
| | 4 | 3 | 2 | 1 | 0 | −1 | −2 | −3 | −4 |
| 13 | 691.6 | 697.02 | 685.79 | 656.53 | 617.1 | 559.51 | 501.93 | 454.59 | 406.03 |
| 12 | 927.72 | 939.04 | 919.03 | 842.62 | 749.13 | 664.62 | 572.09 | 502.01 | 444.37 |
| 11 | 1217.09 | 1223.23 | 1153.2 | 1080.41 | 950.22 | 811.85 | 668.3 | 569.99 | 493.42 |
| 10 | 1369.44 | 1385.64 | 1333.13 | 1240.21 | 1089.85 | 928.62 | 730.31 | 592.96 | 508.99 |
| 9 | 1462.21 | 1519.08 | 1510.22 | 1440.08 | 1293.58 | 1075.67 | 844.25 | 659.55 | 563.41 |
| 8 | 1591.35 | 1589.63 | 1557.68 | 1583.24 | 1392.75 | 1202.15 | 955.5 | 756.39 | 523.19 |
| 7 | 1537.42 | 1579.17 | 1561.59 | 1513 | 1372.10 | 1204 | 990.68 | 809.42 | 657.21 |
| 6 | 1410.77 | 1435.68 | 1431.6 | 1367.12 | 1276.08 | 1119.37 | 970.05 | 837.4 | 692.91 |
| 5 | 1203.12 | 1237.9 | 1242.63 | 1198.77 | 1144.62 | 1045.9 | 943.67 | 806.12 | 683.26 |
| 4 | 962.45 | 974.51 | 997.67 | 982.99 | 959.21 | 913.18 | 827.72 | 744.38 | 655.6 |
| 3 | 731.82 | 728.89 | 716.68 | 717.07 | 695.27 | 677.95 | 645.95 | 599.39 | 529.5 |
| 2 | 417.2 | 409.17 | 395.82 | 391 | 392.88 | 393.28 | 366.76 | 342.27 | 298.92 |
| 1 | 184.69 | 181.36 | 176.57 | 172.01 | 169 | 166.73 | 155.39 | 138.66 | 115.07 |

Set out in Table 2 are the actual photometric distribution readings for the test conducted by CSA with the vertical columns showing the reading for each degree of horizontal distance as measured each way from 0 degrees. (that is a point directly in front of the light or at the centre of the light beam).

It should be noted that, according to the requirements stipulated by Transport Canada the average intensity of the beam of a taxiway light is calculated by establishing a series of evenly spaced grid points extending from the centre line of the beam with adjacent points spaced apart by one degree each way, and using the intensity values measured at all grid points located within and on the perimeter of the rectangle representing the beam. The average value is the arithmetic average of light intensities measured at all considered grid points.

One known difficulty with inset lights for taxiways and runways is that the trough or channel in front of the light window tends to fill up with water in wet weather. The presence of water in the channel or trough can severely cut down on the intensity of the light making it difficult to see. However, because the light output or the intensity of the beam from the light fixture of the invention with a standard size bulb is so great, i.e. eight times that required by government specifications, even if the light channels are filled with water up to ⅛th inch from the top, the light beam coming from the light fixture will still meet government specifications.

It will be readily apparent to those skilled in the construction of airport lights that various modifications and changes can be made to the preferred inset light fixtures described herein. All such modifications and changes as fall within the scope of the appended claims are intended to be included as part of this invention.

I therefore claim:

1. An inpavement light fixture for mounting in pavement of an airport runway or taxiway comprising:

a cover with a generally flat top surface and a bottom, said cover having at least one window for passage of an output light beam and a cavity formed therein, which cavity is open at said bottom of the cover;

an optical prism detachably mounted to said cover adjacent said window, said prism having three flat sides forming an equilateral triangle with two of said three sides sloping upwardly to a top edge which is positioned at a top of said window, said prism fitting in said cavity;

a sealing member fitting over said prism and covering one of said two sides which slope upwardly, said sealing member also extending about a lower portion of said prism and forming a watertight seal between said cover and said prism;

electric light means capable of beaming light into said prism, said light means being mounted in said fixture and below said cover;

detachable means for holding said prism in said cavity, said detachable means being attached to said cover, and a bottom receptacle on which said cover is supported.

2. An inpavement light fixture according to claim 1 wherein said optical prism is formed with a bottom flange that projects horizontally from the bottom of said two sides of said prism that slope upwardly, and wherein said sealing member extends over an upper surface of said bottom flange.

3. An inpavement light fixture according to claim 1 wherein said holding means comprises a generally flat plate having an opening formed centrally therein for the passage of light to said prism and threaded fasteners for securing said plate to said cover.

4. An inpavement light fixture according to claim 1 wherein said sealing member has two upwardly sloping and converging side walls and two vertical end walls extending between said side walls and connecting said side walls, one of said side walls covering said one side of said prism while the other side wall has an opening formed therein for the passage of light out of said prism, and wherein said one side of said prism is a light reflecting surface.

5. An inpavement light fixture according to claim 3 including a gasket arranged between said flat plate and a bottom surface of said prism, said gasket having a central opening and extending about the perimeter of said bottom surface.

6. An inpavement light fixture for mounting flush with payment of an airport runway or taxiway comprising:

a cover assembly with a flat top surface, that extends to a peripheral edge of the cover assembly, and at least one window formed therein for passage of an output light beam, said cover assembly having a light channel formed in its top and extending from said at least one window towards an edge of said cover assembly, said light channel having a bottom that slopes at a small angle to said flat top surface and up to the plane of said flat top surface, said channel being confined to said cover assembly;

an optical prism for projecting said output light beam mounted in said cover assembly adjacent said window;

electric light means for beaming light into said prism and mounted in said fixture below at least the top surface of said cover assembly; and a fixture base on which the entire cover assembly is detachably mounted, wherein said cover assembly extends generally horizontally in use when the fixture is mounted in said pavement and the horizontal dimensions of said cover assembly correspond substantially to horizontal dimensions of a top portion of the base so that said cover assembly in use does not project a substantial horizontal distance beyond the top of said base.

7. A light fixture according to claim 6 wherein said top surface is very flat and does not at any point thereon project more than 1/8th inch above the height of said top surface at said peripheral edge of said cover assembly.

8. An inpavement light fixture for mounting flush with pavement of an airport runway or taxiway comprising:

a cover assembly with a flat top surface, that extends to a peripheral edge of the cover assembly, and at least one window formed therein for passage of an output light beam, said cover assembly having a light channel formed in its top and extending from said at least one window towards an edge of said cover assembly, said light channel having a bottom that slopes at a small angle to said flat top surface and being confined to said cover assembly;

an optical prism for projecting said output light beam mounted in said cover assembly adjacent said window, said optical prism having three flat sides with each of said three sides extending at a 60 degree angle to the other two sides and two of said three sides sloping upwardly towards each other at a 60 degree angle to a horizontal plane, one of the two upwardly sloping sides being a highly reflective surface;

electric light means for beaming light into said prism and mounted in said fixture below at least the top surface of said cover assembly; and a fixture base on which said cover assembly is detachably mounted, wherein said cover assembly extends generally horizontally in use when the fixture is mounted in said pavement and the horizontal dimensions of said cover assembly correspond substantially to horizontal dimensions of a top portion of the base so that said cover assembly in use does not project a substantial horizontal distance beyond the top of said base.

9. A light fixture according to claim 7 wherein said electric light means is mounted in said fixture base and includes a concave light reflecting member and a light bulb mounted in front of and centrally of said reflecting member, which member focuses light from said light bulb towards said optical prism.

10. A light fixture according to claim 7 wherein said cover assembly has bolt holes distributed along said peripheral edge thereof and said fixture base has a number of screw holes distributed along said top portion of the base and aligned with further screw holes in a bottom of said cover assembly, and said fixture includes threaded fasteners for connecting said cover assembly to said fixture base, said threaded fasteners extending through said screw holes.

11. A light fixture according to claim 10 wherein recesses are formed in said top surface of said cover assembly around said bolt holes provided therein, said recesses sized to accommodate heads of bolts so that said heads do not project above said flat top surface, said bolts being used to secure said light fixture to an exterior light receptacle.

12. A light fixture for mounting in pavement of an airport runway or taxiway comprising:

a cover with a generally flat top surface, said cover having opening for passage for an output light beam;

an optical prism device mounted in said cover adjacent to said opening, said prism device incorporating therein a dichroic filter so that said output light beam has a desired colour, said prism device having three flat exterior sides with each extending at a 60 degree angle to the other two sides and one of said three sides sloping upwardly and extending across said opening;

a bottom receptacle on which said cover is supported; and electric light means mounted in said fixture and arranged to beam light into said prism device from below said cover.

13. A light fixture according to claim 12 wherein said optical prism comprises first and second transparent members, the first member comprising an elongate prism forming an equilateral triangle in transverse cross-section and the second member comprising a flat plate affixed to and covering a bottom surface of said elongate prism, said dichroic filter comprising dichroic colouring on a top side of said second member, said top side located immediately adjacent to a bottom side of said first member.

14. A light fixture according to claim 12 wherein said optical prism device is an integral, one-piece prism having top and bottom portions, said top portion forming an equilateral triangle in transverse cross-section and said bottom portion being generally planar with opposite edge sections projecting horizontally beyond bottom edges of said top portion.

15. A light fixture according to claim 12 wherein one of said three flat exterior sides of the prism device forms a highly reflective surface that slopes at an approximately 60 degree angle to said flat top surface of said cover.

* * * * *

UNITED STATES PATENT AND TRADEMARK OFFICE
CERTIFICATE OF CORRECTION

PATENT NO. : 5,669,691
DATED : September 23, 1997
INVENTOR(S) : Fred Robert Barrow It is certified that error appears in the above-identified patent and that said Letters Patent is hereby corrected as shown below:

Column 7, line 46, delete "beans" and insert therefor --means--;

Columns 9 - 10, Table 2,

Horizontal Degree (column) 0, seventh figure down, delete "1372.10" and insert therefor --1372.19--, Horizontal Degree (column) -2, third figure down, delete "668.3" and insert therefor --658.3--, Horizontal Degree (column) -4, sixth figure down, delete "523.19" and insert therefor --623.19--.

Signed and Sealed this

Twelfth Day of January, 1999

Attest:

Attesting Officer

*Acting Commissioner of Patents and Trademarks*